United States Patent [19]

Taylor

[11] Patent Number: 4,691,001
[45] Date of Patent: * Sep. 1, 1987

[54] PROCESS FOR MAKING SOLID UREA-FORMALDEHYDE RESINS

[75] Inventor: David Taylor, Halesowen, England

[73] Assignee: BIP Chemicals, Ltd., Manchester, England

[*] Notice: The portion of the term of this patent subsequent to Jan. 14, 2003 has been disclaimed.

[21] Appl. No.: 793,318

[22] Filed: Oct. 31, 1985

Related U.S. Application Data

[63] Continuation-in-part of Ser. No. 704,405, Feb. 22, 1985, Pat. No. 4,564,667.

[30] Foreign Application Priority Data

Feb. 23, 1984 [GB] United Kingdom ............... 8404758
Aug. 1, 1985 [GB] United Kingdom ............... 8519392

[51] Int. Cl.$^4$ ............................................. C08G 12/34
[52] U.S. Cl. .................................. 528/256; 523/331; 528/254; 528/259; 528/260; 528/261; 528/262; 528/265

[58] Field of Search ............... 528/256, 259, 260, 261, 528/254, 262, 265; 524/598, 843

[56] References Cited

U.S. PATENT DOCUMENTS

| | | | |
|---|---|---|---|
| 2,413,697 | 1/1947 | Edgar | 528/256 |
| 3,102,108 | 8/1963 | Aebi et al. | 528/259 |
| 3,842,039 | 10/1974 | Vargiu et al. | 528/259 X |
| 4,064,088 | 12/1977 | Reaser | 528/268 X |
| 4,113,701 | 9/1978 | Laqua et al. | 528/256 X |
| 4,174,310 | 11/1979 | Hubbard | 528/256 X |
| 4,381,368 | 4/1983 | Spurlock | 524/598 |
| 4,564,667 | 1/1986 | Taylor | 528/256 |

Primary Examiner—Theodore E. Pertilla
Attorney, Agent, or Firm—Nixon & Vanderhye

[57] ABSTRACT

A process for the manufacture of a solid urea-formaldehyde resin comprises steps (a) to (d). Step (a), the initial reaction step is carried out under specified conditions with an F:U ratio of at least 2.5 to 1. The F:U ratio is lowered by addition of urea in step (c) and water is evaporated without precipitation of the resin in step (d).

17 Claims, No Drawings

PROCESS FOR MAKING SOLID UREA-FORMALDEHYDE RESINS

CROSS-REFERENCE TO RELATED APPLICATIONS

This application is a continuation-in-part of earlier application Ser. No. 704,405, filed Feb. 22, 1985, now U.S. Pat. No. 4,564,667 issued Jan. 14, 1986.

This invention relates to the manufacture of resins and in particular to the manufacture of resins from urea and formaldehyde.

In our U.S. patent application No. 704,405, now U.S. Pat. No. 4,564,667, we have described and claimed a process for the manufacture of a solid urea-formaldehyde resin which comprises the steps of (a) reacting a solution of formaldehyde in water with urea at a molar ratio of formaldehyde to urea which is greater than 2.5:1, (b) concentrating the solution so made until its total water content was less than 50% by weight.

(c) adding further urea to adjust the molar ratio of formaldehyde to urea to between 2.0:1 and 1.1:1 and (d) concentrating the solution further without precipitation of solid resin to reduce the water content to such a level that on cooling the liquid resin product, a friable solid is obtained, wherein a stabilization agent is reacted into said solution of formaldehyde or formaldehyde and urea prior to step (d) in order to prevent precipitation of resin in step (d).

This process is suited to batch manufacture of resin using bulk evaporation in step (d) and uses a stabilization agent which is reacted into the resin prior to step (d).

The process can be used to make solid resin if step (d) is carried out in other ways but we have also found that if the other steps are carried out in particular ways, and step (d) is carried out rapidly in a vacuum kneader or on a thin film evaporator the stabilization agent need not be used.

Thus according to the present invention a process for the manufacture of a solid urea-formaldehyde resin comprises the steps of (a) reacting a solution of formaldehyde in water with urea under acid conditions at a molar ratio of formaldehyde to urea which is greater than 2.5 to 1 the reaction conditions being 15 to 100 minutes at 100° C. at pH6 or their equivalent, adjusting the pH to be neutral to mildly alkaline and if necessary (b) concentrating the solution so made its water content to less than 50 percent by weight (c) adding further urea to adjust the molar ratio of formaldehyde to urea to between 2.0 to 1 and 1.1 to 1, and (d) evaporating water from the solution under conditions whereby rapid evaporation of water takes place without substantial increase in the degree of condensation of the resin and without substantial precipitation of the solid resin to reduce the water content to such a level that on cooling the liquid resin product a friable solid is obtained.

The first step of the process is reaction of urea and formaldehyde under acid conditions. It will be appreciated that the higher the temperature the greater is the rate of reaction and lowering the pH of the solution has the same effect. By "equivalent conditions" we mean conditions of temperature/time/pH which will give rise to the same degree of condensation in the reaction product.

Degree of condensation may be determined from the following formula $$\text{Degree of condensation (\%)} = \left( \frac{\text{Total HCHO (1)} - \text{Methylol HCHO (2)}}{\text{Total HCHO (1)}} \right) \times 100$$

Where (1) Total HCHO is the total formaldehyde content determined by acid hydrolysis followed by sulphite determination of liberated formaldehyde (2) Methylol HCHO content is determined by the ACC Sulphite method.

The pH is preferably adjusted when necessary during the process using such reagents as sodium hydroxide and formic acid. It is preferred not to use a mineral acid.

Since precipitation of highly condensed insoluble resin is to be avoided step (a) should be carried out in a controllable manner and temperatures above 100° C. would normally not be used. Similarly a pH below 4 would normally be avoided.

Temperatures up to 150° could be employed if the reaction were carried out under elevated pressure in a suitable vessel and appropriate modification of the pH conditions would then be required.

Alternative conditions to the 15 to 100 minutes at pH6 and 100° C. can readily be determined experimentally by those skilled in the art.

The step (b) need only include concentration if the water content at the end of step (a) is above 50 percent by weight, but it is necessary to adjust the pH to neutral or mildly alkaline conditions. Theoretically neutrality is the ideal, however, the urea added in step (c) is slightly acidic and it is usual to make the solution mildly alkaline in step (b) to ensure that the urea addition does not re-create acid conditions.

In step (c) care must be taken to make sure that the molar ratio of formaldehyde to urea does not fall below 1 to 1 at any stage.

The step (d) will generally be carried out using a thin film evaporator or a vacuum kneader. These create conditions wherein water can be removed very rapidly thereby enabling concentration to take place without substantial further condensation of the resin.

The total water content of the solid resin product produced after cooling is in the range 5% to 12% and the resin is readily soluble in water. Preferably the degree of condensation of the solid resin is in the range 25 to 50 percent, more preferably 30 to 43 percent.

Resin modifiers may be introduced into the resin at any stage of the reaction for benefits they may give during subsequent uses of the solid resin. Modifiers which can be used include, for example, melamine, p-toluene sulphonamide and sulphanilamide. The amount of such modifier when used in this way is preferably not more than 5% by weight of the total resin. There is no theoretical minimum but in general at least 1% by weight would normally be used to gain the desired benefits in subsequent performance when using the resin.

If it is desired to produce a mixed resin, greater amounts of the modifier compounds may be incorporated for example up to 30% by weight of the resin. Melamine is particularly suitable to be used in this way.

The resin may be used for example as the solid resin in the amino formaldehyde compositions described in our U.S. patent application No. 729,353, now U.S. Pat. No. 4,623,691.

The invention will now be particularly described, by way of example only, by means of the following Examples.

EXAMPLES (a) Preparation of resin solutions (Steps A to C)

In all of the preparations of the solutions the following formulation was used: 200 liters 44% Formalin, 66 kg urea This was reacted under acid conditions pH 5.8–6.0 for 15, 60 and 90 minutes. At this point the pH was adjusted to 7.8–8.0, and the distillate removed was weighed. If less than 74 kgs had been removed, which was the case in both the 15, and 60 minute preparations, vacuum concentration was carried out at 65° C. until the required amount of distillate had been removed.

In the 90 minute acid phase preparation more than 74 kg of distillate was removed, therefore the difference was returned to the still and no vacuum concentration was required.

63 kg urea with PTSA and Melamine to give 1.8% and 1% in the resin was added to the 15 and 60 minute acid phase resin solutions and dissolved before discharging. In the case of the 90 minute acid phase resin 63 kg of urea was added and disolved but only half was discharged initially. To the other half were added 1.8% PTSA* and 1% Melamine as modifiers and disolved before the resin solution was discharged.
(*PTSA is p-toluene sulphonamide)

(b) Evaporation of resin solutions (step d)

The resin solutions so prepared were fed to a thin film evaporator for water to be removed for step (d). The evaporator used had a steam heated drum 155 mm in diameter and 2.5 sq. ft. of evaporation surface.

The steam pressures rotor spead, feed rate etc were successfully adjusted in order to produce a brittle resin in each case and details of the process conditions are given in table 1 over the page.

TABLE 1

| Example No | 1 | 2 | 3 | 4 |
|---|---|---|---|---|
| Resin | 15 Min acid phase (Modified) | 60 Min acid phase (Modified) | 90 Min acid phase (Modified) | 90 Min acid phase (Unmodified) |
| Steam Pressure (psi) | 80 | 80 | 75 | 80 |
| Rotor Speed (rpm) | 370 | 370 | 290 | 290 |
| Product Temp. (°C.) | 125 | 125 | 125 | 123 |
| Feed Rate (Kg/hr) | 32 | 41 | — | — |
| Comments | one resin sample precipitated | satisfactory | Resins tended to exotherm in cooling tray | |

The composition and properties of the solid resins produced are given below in Table II.

TABLE II

| Example No | 1 | 2 | 3 | 4 |
|---|---|---|---|---|
| Urea: Formaldehyde molar ratio | 1:1.43 | 1:1.43 | 1:1.42 | 1:1.42 |
| Total H$_2$O content (%) | 11.4 | 11.9 | 10.7 | 11.5 |
| Free H$_2$ content (%) | 1.7 | 1.6 | 2.4 | 2.09 |
| Degree of Condensation (%) | 34.5 | 40.0 | 48.7 | 41.4 |
| Melting Point (°C.) | 89 | 60 | 75 | 73 |

The examples clearly establish that satisfactory resins may be produced using the process as described, and a thin film evaporator.

The resins produced with 15 minute acid treatment showed some signs of instability, one precipitating unexpectedly and it was concluded that the 15 minute treatment is the borderline for stable resin.

The 60 minute resin was satisfactory in every way. The 90 minute resins produced were satisfactory but the tendency to exotherm when discharged from the evaporator showed signs of impending difficulty. An attempt to produce a resin using a 120 minute acid reaction phase totally failed, the resin overheating and gelling during water removal.

I claim:

1. A process for the manufacture of a solid urea-formaldehyde resin which comprises the steps of
   (a) reacting a solution of formaldehyde in water with urea under acid conditions at a molar ratio of formaldehyde to urea which is greater than 2.5 to 1 the reaction conditions being 15 to 100 minutes at 100° C. at pH6 or their equivalent, and adjusting the pH to be neutral to mildly alkaline;
   (b) concentrating the solution so made its water content to less that 50 percent by weight
   (c) adding further urea to adjust the molar ratio of formaldehyde to urea to between 2.0 to 1 and 1.1 to 1, and
   (d) evaporating water from the solution under conditions whereby rapid evaporation of water takes place without substantial increase in the degree of condensation of the resin and without substantial precipitation of the solid resin to reduce the water content to such a level that on cooling the liquid resin product a friable solid is obtained.

2. A process according to claim 1 which is not carried out under elevated pressure and is carried out at a temperature not greater that 100° C. and a pH in the range 4 to 6.

3. A process according to claim 1 in which step (d) is carried out using a thin film evaporator or a vacuum kneader.

4. A process according to claim 1 in which a resin modifier is incorporated into the resin at any stage of the reaction, the resin modifier selected from melamine, p-toluene sulphonamide, sulphanilamide and mixtures thereof.

5. A process according to claim 4 in which the modifier compound is melamine and is incorporated in an amount up to 30% by weight of the resin.

6. A process according to claim 1, in which the degree of condensation of the solid resin is in the range of 25 to 50 percent.

7. A process according to claim 6, in which the degree of condensation is in the range of 30 to 43 percent.

8. A process for the manufacture of a solid urea-formaldehyde resin which comprises the steps of:

(a) reacting a solution of formaldehyde in water with urea under acid conditions at a molar ratio of formaldehyde to urea which is greater than 2.5 to 1, the reaction conditions being 15 to 100 minutes at 100° C. at pH6 or their equivalent, and adjusting the pH to be neutral to mildly alkaline;

(b) adding further urea to adjust the molar ratio of formaldehyde to urea to between 2.0 to 1 and 1.1 to 1; and (c) evaporating water from the solution under conditions whereby rapid evaporation of water takes place without substantial increase in the degree of condensation of the resin and without substantial precipitation of the solid resin to reduce the water content to such a level that on cooling the liquid resin product a friable solid is obtained.

9. A process according to claim 8, which is not carried out under elevated pressure and is carried out at a temperature not greater than 100° C. and a pH in the range 4 to 6.

10. A process according to claim 8, in which step (c) is carried out using a thin film evaporator or a vacuum kneader.

11. A process according to claim 8, in which a resin modifier is incorporated into the resin at any stage of the reaction, the resin modifier selected from melamine, p-toluene sulphonamide, sulphanilamide and mixtures thereof.

12. A process according to claim 11, in which the modifier compound is melamine and is incorporated in an amount up to 30 percent by weight of the resin.

13. A process according to claim 8, in which the degree of condensation of the solid resin is in the range of 25 to 50 percent.

14. A process according to claim 13, in which the degree of condensation is in the range of 30 to 43 percent.

15. A resin comprising a reaction product of urea and formaldehyde having a ratio of formaldehyde to urea which is between 2.0:1 and 1.1:1 wherein the degree of condensation of the resin is greater than 45 percent but not greater than 50 percent and the resin is solid at room temperature.

16. A solid resin according to claim 15, which contains a resin modifier selected from melamine, p-toluene sulphonamide, sulphanilamide and mixtures thereof.

17. A solid resin according to claim 16, in which the amount of said resin modifier is in the range of 1 percent to 5 percent by weight of the total resin.

* * * * *